United States Patent Office 2,883,331
Patented Apr. 21, 1959

2,883,331
INHIBITED REACTOR COOLANTS AND
USE THEREOF

Robert O. Bolt, San Rafael, Beppino J. Fontana, Berkeley, and James R. Wright, El Cerrito, Calif., assignors, by mesne assignments, to the United States of America as represented by the United States Atomic Energy Commission No Drawing. Application July 23, 1956
Serial No. 599,351

7 Claims. (Cl. 204—193.2)

The present invention relates to cooling nuclear reactor and pertains more particularly to improved coolants having superior properties and their use to cool reactors and/or reactor components, e.g., moderators, reflectors, fuel elements, etc.

Since a reactor is a constant and continuing source of heat, coolant means are provided for removing such heat so that it can be used effectively to produce useful power. In reactors the liquid coolant is made to contact the fuel elements, the substance containing the fuel, or other reactor components such as the moderators or reflectors. Often the coolant in the reactor transfers its heat in a heat exchanger to a second coolant which then carries the heat to the power generating point. Such primary and secondary coolants are conveniently used to remove heat from the reactor while limiting the regions where radioactive materials must be handled. Since the higher the temperature the more efficient the over-all reactor power plant, coolants are most suitable when they are able to withstand very high temperatures. Apparently the minimum temperature desired for operation of a reactor plant is of the order of 400° C. Hence the coolant must withstand such temperatures for appreciable times and radiation dosages.

Heretofore, water has been proposed and used as a reactor coolant. However, it has the disadvantages of corroding metals of construction, of possessing a high vapor pressure at the operating temperatures encountered, particularly in high temperature nuclear reactors, and of becoming radioactive on exposure to neutrons. Liquid metals have also been proposed as coolants for high temperature nuclear reactors. However, the handling of the liquid metals such as sodium and potassium is hazardous and comparatively difficult. The alkali metals, e.g., sodium, potassium and lithium, are extremely active chemically. Other liquid metals, such as lead and lead-bismuth, are corrosive to many high temperature structural metals.

As compared to water and liquid metals, certain polynuclear aromatic hydrocarbon compositions have superior properties as reactor coolants, whereby the disadvantages entailed in the use of these prior coolants are minimized or avoided. Thus, the polynuclear aromatic hydrocarbon coolants are not normally corrosive to metals or other materials contacted in a nuclear reactor system. Also, these aromatics, and particularly the polyphenyls, are more resistant than other organics to deterioration by the combined action of elevated temperatures and nuclear irradiation. They have desirable high thermal conductivity and high heat capacity and are liquids of suitable viscosities at the operating temperatures.

For plant efficiency, the skin and bulk temperatures of the coolant for the reactor or reactor moderator should be as high as possible; hence the tendency of the coolant to coke at the point of heat transfer and thereby to decrease the efficiency of heat transfer is disadvantageous. While increases in viscosity are not especially disadvantageous with respect to increased pumping difficulties, an increase in viscosity of a hydrocarbon coolant on irradiation indicates polymerization and hence a tendency toward incipient coking. As compared to other organics, the polynuclear aromatic hydrocarbons have a lesser tendency to coke and to form deposits in heat exchanger tubes.

Another important advantage of these compositions is that they have a low vapor pressure which allows a reduction in the size and cost of the nuclear reactor pressure vessels. Furthermore, the mixed polyphenyls have a low residual radioactivity from neutron capture and hence are suitable for primary or secondary coolants. This last advantage permits a minimum of coolant shielding external to the primary nuclear reactor shielding.

It has been found that, whereas certain polynuclear aromatic hydrocarbons such as polyphenyls have greater resistance, as compared to other organic materials, to deterioration induced by exposure to neutron irradiation at elevated temperatures, such resistance can be even further improved by the incorporation of certain aryl selenium and sulfur compounds in the polynuclear aromatic hydrocarbons.

Although applicants do not wish to be bound by any theory, the effectiveness of such additives may follow from their interference with the decomposition mechanism. According to the mode of radiation-induced decomposition of organic materials postulated by Burton (J. Physical and Colloid Chem., 51, 786; 1947), ionization takes place first, followed by ionic discharge and decomposition. Olefinic materials formed by this decomposition can be polymerized by free radicals generated in the ionic discharge reaction. Also, free radicals can be formed by dehydrogenation, for example, of biphenyl; these free radicals can dimerize or combine to produce high molecular weight materials. The present aromatic selenium and sulfur compounds appear to interfere with the propagation of the polymer chains as well as the formation of higher molecular weight materials from the free radical. Hence, the additives promote radiation resistance. At elevated temperatures the aromatic additives appear to be superior to the non-aromatic analogues.

The radiation-resistance improvers of the present invention are aromatic compounds containing at least two phenyl rings and at least one sulfur or selenium atom or both, the compounds being substantially free of elements other than C, H, S and Se. Suitable compounds are those containing one or two thio or seleno-ether linkages between two phenyl rings, which in the case of a single thio- or seleno-bridge may also have a methylene bridge in ortho-ortho position to give a stable ring structure analogous to anthracene. As examples may be mentioned dibenzothiophene, thianthrene, thioxanthene, diphenylene sulfide, diphenyl sulfide, and the corresponding selenium analogues. Also suitable are aromatic compounds having a methylene group interposed between the phenyl ring and the sulfur or selenium atom, particularly in the case of the latter; examples include dibenzyl selenide, phenylbenzyl selenide and the like. The less volatile higher molecular weight materials are often preferred; these include bis-biphenyl selenide, dinaphthyl selenide and the like.

The additives of the present invention are used in small amounts normally less than 10% but more than 1%, especially from about 3% to 8%. As illustrated hereinbelow, larger amounts up to about 50-60% can sometimes be used to impart improved properties, where the induced radioactivity of the coolant composition is not so important.

Suitable polynuclear aromatic hydrocarbons include the preferred non-fused ring class of polyphenyls, such as biphenyl, metaterphenyl, orthoterphenyl and para-terphenyl, and the various quaterphenyls and the fused ring aromatics, such as naphthalene, anthracene, phen-anthrene and binaphthyl. The presence of non-aromatic substituents such as alkyl groups tend to reduce the stability of neutron radiation and heat and hence the preferred polynuclear aromatic compounds are generally free of such substituents. Furthermore, the polynuclear aromatic mixtures are substantially free from halogenated material, particularly chloro and fluoro compounds which generate very corrosive products in a nuclear radiation environment at elevated temperatures. Because of their greater stability under the combined action of neutron irradiation and heat, preferred are mixtures of polynuclear aromatic hydrocarbons, initially substantially free of polynuclear aromatic hydrocarbons of more than 4 aromatic rings per molecule, as described in copending application filed concurrently herewith, Serial No. 599,352, in the names of Beppino J. Fontana, James R. Wright and Robert O. Bolt, entitled Method of and Preparation for Cooling Nuclear Reactor System.

Although, as indicated above, the polynuclear aromatic hydrocarbons prepared for use in accordance with the present invention are free of substantial amounts of compounds having more than 4 aromatic rings, the components of these compositions tend to polymerize upon exposure to nuclear radiation. The compositions in use can develop a polymer content up to about 30-40% before deleterious deposition becomes sufficiently large to require purification and/or replacement. To illustrate, biphenyl develops about 30% polymer per dosage of $10^{18}$ fast neutrons (i.e., above 0.5 e.v.)/cm$^2$.

The presence of other additives in the present compositions may be objectionable, especially when these other additives adversely react with components of the mixture or are themselves undesirable in the particular nuclear radiation environment in which they are used. In some instances, where the temperatures are not excessive (such as in a secondary coolant) or where radioactivity of the coolant due to additives and the size of the required secondary shielding are not critical, other additives may be incorporated in the present polynuclear aromatic hydrocarbon compositions.

In the following examples given by way of illustration of the present invention, the change in viscosity, and the amount of coking or tendency to form coke are used as indexes of damage. As a criterion of viscosity change, $\eta_1$ (or $\eta_{10}$) is used and is defined as the viscosity of an irradiated fluid at the temperature, $T_1$ (or $T_{10}$) at which the viscosity of the starting material was 1 centistoke ("cs.") (or 10 cs.). By this index the initial viscosity of each fluid is 1 cs., and the viscosity change can be measured in terms of deviation from this common point. Gas evolution is expressed as milliliters (ml.) of gas (measured at 0° C. and 1 atmosphere) generated per milliliter of fluid charged. Coke is defined as the relatively infusible and/or nonvolatile fraction of the pyrolysis and radiolysis residues. In many cases coke is estimated from the simple manual recovery of the sample. The percent liquid, quoted in the tables, represents liquid saturated with respect to the solid phase at room temperature. In some cases a simple, one-stage, high vacuum distillation was performed to separate coke from the volatile solid fraction. Treatment in the latter separation was for one hour at 315° C. at about 1 micron pressure. The amount of coke is a good index of the amount of the deposition tendency on heat transfer surfaces.

In the following examples, stainless steel capsules of 22 ml. capacity were employed. These were charged at room temperature with 10 ml. of the sample being tested. All the samples were blanketed with helium to exclude oxygen, because of the harmful effect of this agent on organic materials in the presence of radiation. The capsules were then sealed and 16 capsules (8 deep and 2 across) were placed in an oven which was inserted in a reactor. Automatic temperature control was provided. The temperature was indicated by a thermocouple placed in the center of the oven. The temperature of each capsule was estimated from the temperature so measured taken together with the temperature gradient found in the oven as determined in a subsequent test with a thermocouple on each capsule. After the exposure, the containers were allowed to decay in radioactivity for a few days and then were opened for inspection and analysis.

The irradiations were conducted in the Brookhaven reactor (hole E–25). The combined flux existing in this facility was estimated as follows: for fast neutrons, neptunium-237 and uranium-238 fission monitors were employed (see Physics Review, vol. 94, pp. 969–73; 1954). Small aluminum disks containing about 0.5% cobalt, were used to measure slow and resonance neutrons by exposures in the bare or cadmium shielded condition. The gamma flux in the Brookhaven facility was measured with a simple calorimeter which consisted of a lead rod insulated everywhereby but on one end. The temperature difference between two points in the rod depended upon the heat input from gamma radiation. By these means, the resonance neutron flux (about 0.5 e.v. to 0.6 m.e.v.) was determined to be approximately 10% of the subcadmium slow neutron flux (below about 0.5 e.v.). Similarly, the fast neutron flux (above about 0.6 m.e.v.) was shown to be approximately 25% of the subcadmium slow neutron flux. With the assumption of 1 m.e.v. as the average energy of a reactor gamma photon, this flux was found to be about 45% of the subcadmium slow neutron flux. As these ratios hold for the various positions used in this particular facility, the combined reactor dosage or integrated flux will generally be expressed in terms of the more easily measured slow and resonance neutrons, even though these components are not the major contributions to damage. Thus, where dosage is shown hereinbelow as slow plus resonance neutrons per square centimeters, designated as "$n_s$ (bare Co)/cm.$^2$," gamma radiation and fast neutrons are also present in the ratios indicated above.

EXAMPLE I

In the following table are given the results of irradiations carried out in accordance with the procedure described above on various individual compounds as well as compositions prepared in accordance with the present invention. The dosage was about $2 \times 10^{18}$ $n_s$ (bare Co)/cm.$^2$. In the table are given the temperatures of the "lowest observed coking temperature" and "highest observed usable temperature." The former term refers to the temperature at which the test material is no longer liquid and is essentially a solid mass. The latter term means the highest test temperature at which the material was still a liquid in usable condition (i.e., probably not yet requiring make-up fluid), although small amounts of coke might be contained in the liquid material. Low values for "lowest observed coking temperatures" are the limiting values; i.e., a temperature given under this heading indicates that coking will take place at higher temperature. In the column labeled "highest observed usable temperature," the high values are the important ones, since a temperature given at this temperature, but does not exclude the possibility of a test at a higher temperature showing that the fluid may be used at even higher temperatures.

Table I

| Test No. | Base Material | Additive | Lowest Observed Coking Temp. (°F.) | Highest Observed Usable Temp. (°F.) |
|---|---|---|---|---|
| 1 | Biphenyl | 5% dibenzyl selenide | 807 | 750 |
| 2 | Ortho-terphenyl | do | | 783 |
| 3 | Meta-terphenyl | do | | 785 |
| 4 | Naphthalene | None | 809 | 744 |
| 5 | do | 5% dibenzyl selenide | | 755 |
| 6 | Phenanthrene | None | 800 | 754 |
| 7 | do | 5% dibenzyl selenide | 828 | 787 |
| 8 | do | 5% thianthrene | 818 | 784 |
| 9 | 30% Biphenyl +70% o-terphenyl | 5% dibenzyl selenide | | 800 |
| 10 | 65% Biphenyl +35% phenanthrene | 5% thianthrene | | 785 |
| 11 | 50% Biphenyl +50% m-terphenyl | None | | 745 |
| 12 | do | 5% dibenzyl selenide | 812 | 815 |
| 13 | do | 5% thianthrene | | 800 |
| 14 | do | 7.5% dibenzyl selenide | 810 | |
| 15 | do | 10% dibenzyl selenide | 808 | |
| 16 | 70% o-Terphenyl +30% m-terphenyl | 5% dibenzyl selenide | | 784 |
| 17 | 50% m-Terphenyl +50% phenanthrene | 5% thianthrene | | 753 |
| 18 | 77% o-Terphenyl +23% phenanthrene | 5% dibenzyl selenide | 815 | 779 |
| 19 | 50% o-Terphenyl +50% phenanthrene | do | | 815 |
| 20 | 50% m-Terphenyl +50% o-terphenyl | do | | 812 |
| 21 | Biphenyl | 50% dibenzothiophene | | 740 |
| 22 | Phenanthrene | 53% dibenzothiophene | 770 | 762 |
| 23 | 57% o-Terphenyl +43% phenanthrene | 30% dibenzothiophene | | 715 |
| 24 | 50% m-Terphenyl, 25% o-terphenyl +25% p-terphenyl | 5% thianthrene | 854 | 787 |

The above data illustrate the effectiveness of the aromatic selenium and sulfur compound in improving the resistance of the polynuclear aromatics to deterioration under neutron radiation at elevated temperatures.

EXAMPLE II

In another series of experiments, fluid samples were prepared and exposed as in Example I to the indicated dosages ($n_s$ (bare Co)/cm.$^2$). The viscosities of the irradiated samples were measured and compared to the viscosities of the unirradiated samples to calculate the index of viscosity change ($\eta_1$), as described hereinabove. Where the viscosities could not be readily measured, the observed condition of the test fluid was noted. The results are given in the following table:

Table II

| Test No. | Composition | Additive | Temperature, °F. | ($\eta_1$) | Dosage |
|---|---|---|---|---|---|
| 30 | Biphenyl | None | 635 | 27 | 7.5×10$^{18}$ |
| 31 | do | 5% Didodecyl selenide | 570 | 36 | 7.5×10$^{18}$ |
| 32 | do | None | 807 | Coked | 2.5×10$^{18}$ |
| 33 | do | 5% Dibenzyl selenide | 740 | 3.4 | 2.5×10$^{18}$ |
| 34 | do | do | 720 | 3.6 | 2.5×10$^{18}$ |
| 35 | 50% Biphenyl +50% Meta-terphenyl | None | 795 | 30 | 2.0×10$^{18}$ |
| 36 | do | 5% Dibenzyl selenide | 815 | 1,607 | 2.0×10$^{18}$ |
| 37 | do | 5% Dibenzothiophene | 812 | Coke | 2.0×10$^{18}$ |
| 38 | do | do | 795 | 17 | 2.0×10$^{18}$ |
| 39 | do | do | 815 | 470 | 2.0×10$^{18}$ |
| 40 | do | 5% Thianthrene | 800 | 21 | 2.0×10$^{18}$ |

The data in Table II above illustrate the superiority of the aromatic selenide over the non-aromatic selenide for the purpose of the present invention.

EXAMPLE III

Another series of test fluids were exposed as, conducted in Example I above, in hole E-25 of the Brookhaven reactor, except that the temperature was controlled and measured more accurately. To eliminate large temperature gradients the oven was more thoroughly insulated and was divided into 6 compartments, each of which contained 10 sample capsules and a separately controlled heater. Also a separate thermocouple was provided for measuring the temperautre of each capsule.

Table III

| Temperature, °F | 750 | 770 | 790 | 810 | 830 | 850 |
|---|---|---|---|---|---|---|
| Radiation Dosage, ×10$^{18}$ | 2.1 | 1.9 | 2.0 | 2.1 | 2.0 | 2.1 |
| Biphenyl | 1.91 | 2.40 | 2.80 | 2.75 | 20.0 | 199.0 |
| 75% Biphenyl+5% Thianthrene | 2.10 | 2.02 | 2.50 | 4.60 | 23.0 | 88.0 |
| 50% Biphenyl+50% m-Terphenyl | 2.70 | 1.75 | 3.30 | 4.80 | 65.0 | 105.0 |
| 95% of 50-50 Biphenyl-m-Terphenyl mixture + 5% Thianthrene | 2.08 | 1.95 | 2.30 | 5.40 | 17.60 | 57.0 |

Although this invention has been described with particular emphasis upon the currently important application to use as primary or secondary coolants for reactor components in nuclear power plant services, it is inherently of much wider applicability. In pursuits other than power generation, where such coolant compositions are unprotectedly disposed in the proximity of neutronic reactors, the composition of the instant invention may likewise afford beneficial results. Moreover, aside from neutronic reactors, the compositions and procedures of the invention may be applied to resist damage from the same types of deleterious radiation, especially neutrons and gamma rays, emitted from other conventional radiation sources, such as radium-beryllium neutron sources, and nuclear reaction effected by means of Van de Graaff generator-energized linear accelerators, and cyclotrons and the like, particularly in such environments which are at high temperatures. Various additional applications of the hereinabove-disclosed method will become apparent to those skilled in the art. It is, therefore, to be understood that all matters contained in the above description and examples are illustrative only and do not limit the scope of the present invention.

We claim:

1. A composition of improved resistance to deterioration at elevated temperatures in the presence of nuclear radiation and suitable for use as a nuclear reactant coolant, said composition consisting essentially of a major portion of a mixture of polyphenyl containing at least a substantial amount of biphenyl and from about 1% to 10% by weight of thianthrene.

2. The method of improving the resistance of polynuclear aromatic hydrocarbons, free of nonaromatic substituents, to deterioration at elevated temperatures in the presence of nuclear radiations which consists of adding to said polynuclear aromatic hydrocarbons, 1–10% by weight of an aromatic compound selected from the group consisting of dibenzyl selenide, thianthrene, and dibenzothiophene.

3. A composition of improved resistance to deterioration at elevated temperatures in the presence of nuclear radiations, consisting essentially of at least one nonfused polynuclear aromatic hydrocarbon free of nonaromatic substituents and containing from about 1% to 10%, by weight, of an aromatic compound selected from the group consisting of dibenzyl selenide, thianthrene, and dibenzothiophene.

4. The composition of claim 3, wherein said hydrocarbon is a mixture of at least two different polynuclear aromatic compounds.

5. The composition of claim 3, wherein said inhibiting aromatic compound is dibenzyl selenide.

6. The composition of claim 3, wherein said inhibiting aromatic compound is dibenzothiophene.

7. The composition of claim 3, wherein said inhibiting aromatic compound is thianthrene.

References Cited in the file of this patent

AECU-3711, Atomic Energy Commission Document, March 15, 1955, pages 1, 6, 7.

AECU-3148, Atomic Energy Commission Document, June 30, 1956, pages 4, 5, 13, 15.